United States Patent [19]

Grimes et al.

[11] Patent Number: 4,718,997
[45] Date of Patent: Jan. 12, 1988

[54] ELECTROCHEMICAL DEVICE

[75] Inventors: Patrick G. Grimes, Westfield; Harry Einstein, Springfield; Richard J. Bellows, Westfield, all of N.J.

[73] Assignee: Exxon Research and Engineering Company, Florham Park, N.J.

[21] Appl. No.: 821,758

[22] Filed: Jan. 23, 1986

Related U.S. Application Data

[63] Continuation of Ser. No. 443,536, Nov. 22, 1982, abandoned.

[51] Int. Cl.⁴ .................. C25B 15/06; C25B 15/08; H01M 8/24; H01M 2/14
[52] U.S. Cl. .................. 204/228; 204/257; 204/269; 429/18; 429/34; 429/39
[58] Field of Search .................. 204/267–270, 204/255, 258, 228; 429/18, 38, 39, 34, 35

[56] References Cited

U.S. PATENT DOCUMENTS

| 4,371,433 | 2/1983 | Balko et al. | 429/18 X |
| 4,415,424 | 11/1983 | Pere | 204/269 X |
| 4,585,539 | 4/1986 | Edson | 204/257 X |
| 4,590,134 | 5/1986 | Warszawski et al. | 429/35 |

Primary Examiner—Donald R. Valentine
Attorney, Agent, or Firm—Joseph J. Dvorak

[57] ABSTRACT

A tunnel protected electrochemical device features channels fluidically communicating between manifold, tunnels and cells. The channels are designed to provide the most efficient use of auxiliary power. The channels have a greater hydraulic pressure drop and electrical resistance than the manifold. This will provide a design with the optimum auxiliary energy requirements.

11 Claims, 7 Drawing Figures

1. Manifold protection power plus pumping power
2. Tunnel protection power plus pumping power
3. Manifold protection power
4. Tunnel protection power
5. Manifold pumping power

ELECTROCHEMICAL DEVICE

The Government of the United States of America has rights in this invention pursuant to contract agreement No. 49-2862 entered into with Sandia National Laboratories on behalf of the U.S. Department of Energy.

RELATED PATENTS AND APPLICATIONS

This is a continuation of application Ser. No. 443,536, filed 11/22/82, now abandoned.

This application is related to U.S. Pat. Nos.: 4,105,829, issued: Aug. 8, 1978; 4,169,816, issued: Oct. 2, 1979; 4,197,169, issued: Apr. 8, 1980; 4,259,417, issued: Mar. 31, 1981; 4,277,317, issued: July 7, 1981; 4,312,735, issued: Jan. 26, 1982; and 4,346,150, issued: Aug. 24, 1982 and U.S. Patent Applications: U.S. Ser. No. 178,993, filed: Aug. 18, 1980 now U.S. Pat. No. 4,365,009; U.S. Ser. No. 204,852, filed: Nov. 7, 1980 now U.S. Pat. No. 4,377,445; U.S. Ser. No. 144,679, filed: Apr. 28, 1980 now U.S. Pat. No. 4,286,027; U.S. Ser. No. 165,412, filed: July 3, 1980 now U.S. Pat. No. 4,293,623; U.S. Ser. No. 160,143, filed: June 16, 1980 now U.S. Pat. No. 4,312,735; U.S. Ser. No. 122,193, filed: Feb. 19, 1980 now U.S. Pat. No. 4,279,732; U.S. Ser. No. 122,706, filed: Feb. 19, 1980 now U.S. Pat. No. 4,285,794; U.S. Ser. No. 268,665, filed: June 2, 1981 now U.S. Pat. No. 4,396,689; U.S. Ser. No. 268,666, filed: June 2, 1981 now abandoned; and U.S. Ser. No. 268,674, filed: June 2, 1981 now U.S. Pat. No. 4,379,814.

Inasmuch as many of the teachings expressed in the above-identified patents and applications may be useful in understanding the present invention, it is desired to incorporate these teachings in this disclosure by way of reference.

FIELD OF THE INVENTION

This invention relates to electrochemical cells, and more particularly to an improved cell construction which can be useful in vehicular battery systems.

BACKGROUND OF THE INVENTION

In recent times, the use of lightweight battery materials and cost efficient battery constructions have been or prime interest to the automotive and battery industries. In particular, the use of shunt-current protected systems are of recent interest. U.S. Pat. No. 4,346,150; issued: Aug. 24, 1982, teaches a low-cost, lightweight, shunt-current protected battery system featuring a stack of cells constructed of alternating plastic sheets comprising separators and electrodes.

The present invention is an improved construction over the manifold-protected design illustrated in the aforementioned patent. The current invention seeks to provide a tunnel protected electrochemical device which optimizes the auxiliary power requirements for operating the cell; i.e. a cell which uses the least amount of energy to both hydraulically pump the electrolyte through the cell, and to electrically protect against shunt currents.

In manifold shunt current protected cells, the hydraulic pumping power tends to decrease with increasing manifold diameters. However, the power required to protect against shunt currents increases as the second power of the manifold diameter. Thus, the protective power to the manifold and the pumping power are inversely coupled.

With the tunnel protection power system, the protective power is less than the manifold protective power. As the diameter of the manifold increases (for a fixed geometry of connections between the manifold and the cells) the protective power through the tunnel asymptotically approaches a maximum. The tunnel protective power becomes essentially independent of the manifold diameter at larger diameters of the manifold. Thus, the summation of the pumping and tunnel protective power has a lower power requirement than the manifold case and has a minimum value at a lower value than the manifold system.

The present invention seeks to optimize the design of a tunnel protected electrochemical device, such that manifolds, tunnels and channels provide for the least consumption of auxiliary power during operation of the system. The invention also seeks to decouple the protective power requirements from the hydraulic pumping power requirements.

The subject invention is useful in the manufacture, construction and assembly of many different kinds of electrochemical cells, and the invention should be interpreted as not being limited to a specific system.

It is of particular interest for use in a circulating zinc-bromine battery, constructed in accordance with the teachings advancing in the aforementioned U.S. Pat. to: Agustin F. Venero, entitled: Metal Halogen Batteries and Method of Operating Same, U.S. Pat. No. 4,105,829, issued: Aug. 8, 1978, and assigned to the present assignee.

The above-mentioned battery system is of particular interest because of its low cost and availability of reactants, its high cell voltage and its high degree of reversibility.

DISCUSSION OF THE RELATED ART

To the best of our knowledge and belief, the various novelties presented and described herein, are completely new within the art of electrochemical system design and construction. The skilled practitioner will gain a particular appreciation of the unique ideas and concepts advanced herein.

SUMMARY OF THE INVENTION

This invention relates to an electrochemical construction comprising a stack of cells each comprised of an integral separator and spacer disposed between adjacent electrodes.

The cells are connected electrically at least in part in series, and connected at least in parallel. At least one manifold fluidically communicates with the cells. At least one tunnel is disposed between the manifold and the cells to provide protective current to the electrochemical device. Respective channels connect each cell to the manifold and tunnel. The channels are designed to have a hydraulic pressure drop and an electrical resistance greater than that of the manifold. This is accomplished by physically disposing the channels upon either separators or electrodes with a long and narrow design. This long and narrow channel design will optimize the hydraulic pumping power and electrical protective power consumption of the cell.

For a better understanding of tunnel protected systems, reference should be made to U.S. Pat. Nos. 4,277,317; issued: July 7, 1981, and 4,312,735; issued: Jan. 26, 1982.

It is an object of this invention to provide an improved electrochemical device;

It is another object of the invention to optimize the auxiliary power requirements of a shunt-current protected electrochemical power;

It is a further object of this invention to provide a construction for an electrochemical device which effectively decouples the auxiliary power requirements such as the hydraulic pumping power from the electrical protective power.

These and other objects of the invention will be better understood and will become more apparent with reference to the following detailed description considered in conjunction with the accompanying drawings.

DETAILED DESCRIPTION OF THE INVENTION

In multicell electrochemical devices having a plurality of cells in series and having an electrolyte which is a common electrolyte to two or more such cells and which includes shared electrolyte, shunt current losses occur as a result of electrical electrolyte conductive bypass paths through the electrolyte around the cells. The present invention is directed to the minimization of shunt currents in such systems and to devices for achieving this result.

As used herein, the term "electrochemical devices" shall be meant to include photoelectrochemical devices such as water photolysis cell devices, photogalvanic cell devices, liquid solar cell devices and to include other electrochemical devices such as batteries, fuel cell devices, chlor-alkali cell devices, metal-air devices, sea water batteries, electrolyzers, electrochemical synthesizers, and electrowinning devices, as well as other devices employing cathodes, anodes and common electrolytes, including bipolar and monopolar multicell devices, and including devices having a plurality of electrolytes (e.g., catholytes and anolytes), or liquid metals.

As used herein, the expression "minimization of shunt currents" shall be used to mean reduction of shunt currents or elimination of shunt currents.

Figure 1:
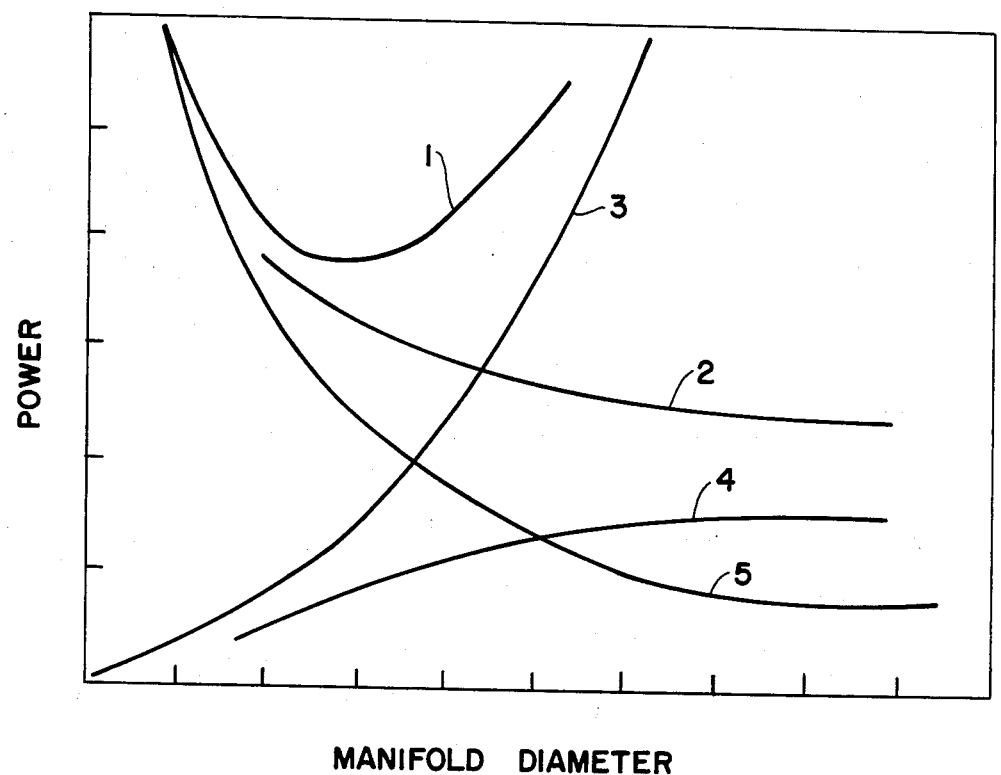
FIG. 1 is a graphical illustration of the auxiliary power requirements of an electrochemical device with respect to manifold size.

Generally speaking, the invention features an improved electrochemical design for a device such as a battery, that minimizes the auxiliary power requirements thereof. FIG. 1 illustrates in graphical form the advantage of designing an electrochemical system utilizing tunnel protection rather than manifold protection.

In a manifold protection system, the protective power increases proportionally to the second power of the diameter of the manifold. The pumping power is proportional to a higher power to the diameter and decreases as the diameter increases. Thus, the protective power to the manifold and the pumping power are directly and inversely coupled. A decrease in one results in an increase in the other, and there is a minimum total power. In the figure, curve #1 represents the summation of the pumping and manifold protective power. The pumping power curve is labeled No. 5 and the manifold power curve is labeled No. 3.

With the tunnel protection power system, the protective power is less than the manifold protective power. As the diameter of the manifold increases (for a fixed geometry of connections between the manifold and the cells) the protective power through the tunnel asymptotically approaches a maximum. The tunnel protective power becomes essentially independent of the manifold diameter at larger diameters of the manifold. Thus, the summation of the pumping and tunnel protective power has a lower power than the manifold case and has a minimum value at a lower value than the manifold system. This is illustrated in FIG. 1 as the curve labeled #2. The tunnel protective power is labeled #4. Thus, at higher manifold diameters, the pumping power and the tunnel protective power are decoupled and become somewhat independent of one another. Greater design flexibility can be utilized in designing electrochemical systems to use tunnel protection rather than manifold protection, as aforementioned.

With respect to tunnel protection, the optimum parameters are sought for a low profile battery similar to that shown in U.S. Pat. No. 4,346,150.

The tunnel protection power requirements are greatly a function of the resistance and, thus, the geometry of the electrolyte channels connecting the electrolyte manifolds and the cells. Designs which have longer, thinner channels when consistant with other design factors are better. The designs must consider the hydraulic pathways for the flowing electrolyte to minimize the pressure drops through the battery system, and allow uniform flow of electrolytes to the cells as well as minimize the shunt current protection power. For a better understanding of tunnel protected devices, reference should be made to U.S. Pat. No. 4,277,317; issued: July 7, 1981.

As previously taught, one method of shunt-current protection is the passage of an appropriate current through the common electrolyte manifold, such that the voltage drop through a manifold segment between two cells is equal to the voltage of a cell, $V_c$. The protective current, $k_o$, required for this condition, is:

$$k_o = V_c/R_m = (V_o + IR_e)/R_m \qquad (1)$$

where:
$R_m$ = resistance of manifold segment; p 1/A
p = specific resistance of electrolyte
l = length of manifold segment
A = cross sectional area of manifold
$V_c = V_o + IR_e$ = voltage of a cell
$V_o$ = open circuit voltage of a single cell
I = cell stack current; plus on charge, minus on discharge
$R_e$ = summation of cell resistances and polarizations When this condition is met, there is no voltage gradient between the cells and the manifold. The $k_o$ current is independent of the number of cells in series.

Another method incorporates connections (tunnels) between the channels connecting the manifolds and the cells and passes an appropriate current, $t_o$, through the common electrolyte network from the first channel/tunnel node to the last channel/tunnel node. The tunnel dimensions and, thus, resistances are graduated such that the voltage drop through a tunnel connecting the channels to two cells is equal to the voltage of a cell, $V_c = V_o + IR_e$.

The tunnel protective current, $t_o$, for this condition is:

$$t_o = \frac{V_o + IR_e}{R_m} \frac{(\lambda'^{N/2} - 1)^2}{\lambda'^N + 1} + t_{N/2} \qquad (2)$$

and $$\lambda' = c/2 + \sqrt{(c/2)^2 - 1} \qquad (3)$$

and $$c = 2 + R_m/R_c \qquad (4)$$

where
N = number of cells in series
$R_c$ = resistance of the channel between the tunnel and the manifold
$t_{N/2}$ = current in the mid-tunnel When these conditions are met, there is no voltage gradient between the cells and the channel/tunnel points and no current flows from the cells through the common electrolyte. The difference between the amounts of protective currents, $k_o$ and $t_o$, [equations (1) and (2)] by the manifold and tunnel methods, respectively, when the central tunnel has large resistance, is mainly the expression in brackets $(v'^{N/2}_{-1})2/(v'^N_{+1})$. This expression has a value of less than one.

The $t_o$ current is less when the value of the bracket term is less. For a given number of cells in series, N, the bracket term is smaller when has a lower value. For a given $R_m$, $v'$ becomes smaller with a smaller $R_m$, i.e. larger cross sectional area of manifold (equations (3) and (4). With a given or fixed $R_m$, the change in the values of $t_o$, with a decrease in the value of $R_m$, becomes less and $t_o$ becomes a constant.

The value of $t_o$ is controlled by the value of $R_c$ and low $R_m$. If $R_c$ is large, then the manifold cross sectional area (diameter) can have a large value without affecting the tunnel protective current.

Uniform supply to and removal from the series of cells requires that the pressure drop in the stack of cells be largely in the cells. The pressure drop in the manifolds must not be the controlling main pressure drop. This requires that the manifold cross sectional area be relatively large for a given number of cells in series, and increase as the number of cells increase.

If manifold protection is used, there is a coupled and direct relationship between the protective current, $k_o$, and the manifold area. (The current increases with the square of the diameter of the manifold.) With tunnel protection there is no direct relationship between manifold area and protective current when the channel resistance is relatively large. The protective current value becomes essentially independent of manifold area. The hydraulic circuitry and the protective current electrolytic circuitry are decoupled.

Systems incorporating tunnel protection require designs with a small $R_m/R_c$ ratio and a relatively large $R_c$ for low power usage.

In some of the zinc-bromine battery designs, channels are needed which are long and have a small cross sectional area. This must be compatable with injection molding tooling design to move plastic through thin cross sections of molds.

In the electrolyte network of N cells, there are N−1 manifold segments and tunnels. The voltage to pass the protective current, in either case, is $(N-1)(V_o+IR_e)$. The minimum protective power requirements are, thus:

$(N-1)(V_o+IR_e)k_o$ for the manifold protection, and $(N-1)(V_o+IR_3)t_o$ for the tunnel protection. The total protective powers are these values multiplied by the number of manifolds.

In summary, an optimum tunnel protected design will require that the hydraulic pressure drop and the electrical resistance (due to the electrolyte) in the respective channels should be greater than that of the manifold.

Figure 2:
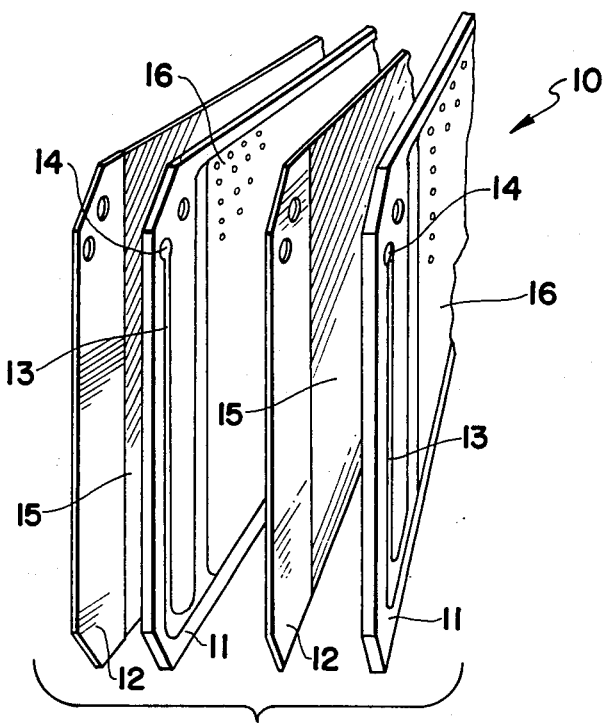
FIG. 2 shows a partial perspective exploded view of the construction of cells in an electrochemical device in accordance with the subject invention.

Referring to FIG. 2, a partial exploded section of the battery stack 10, is shown. The stack 10 comprises alternating sheets of separators 11 and bipolar electrodes 12, respectively, as previously illustrated and described in U.S. Pat. No. 4,346,150.

The present stack 10 is designed for tunnel protection, rather than the manifold protection shown in the aforementioned patent.

Other teachings, such as the operation fabrication and assembly of the battery stack 10 are meant to be incorporated herein by way of reference.

Figure 2A:
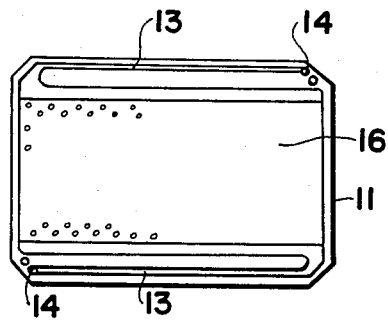
FIGS. 2a and 2b are plan views of separator and electrode elements, respectively, of the construction shown in FIG. 2.
Figure 2B:
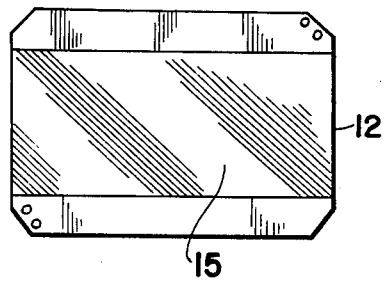

The separators 11 and electrodes 12 are shown in more detail in FIGS. 2a and 2b, respectively.

The separators 11 have molded therein channels 13, which connect to manifold holes 14. When the stack is assembled, manifold holes 14 become a manifold section. The channels 13 are molded, formed or machined, etc. on the top and bottom of the separator 11, as well as on the front and rear faces of the separator 11, in keeping with the bipolar design.

However, the channels 13 could have been formed, molded, or machined into the electrodes 12, if so desired. In order to do this, however, the electrodes 12 and the separators 11 would probably require a change of molding with respect to center undercuts. This change of molding is for the purpose of maintaining proper electrolyte flow to the electrically conductive center portions 15 of electrodes 12.

Figure 3A:
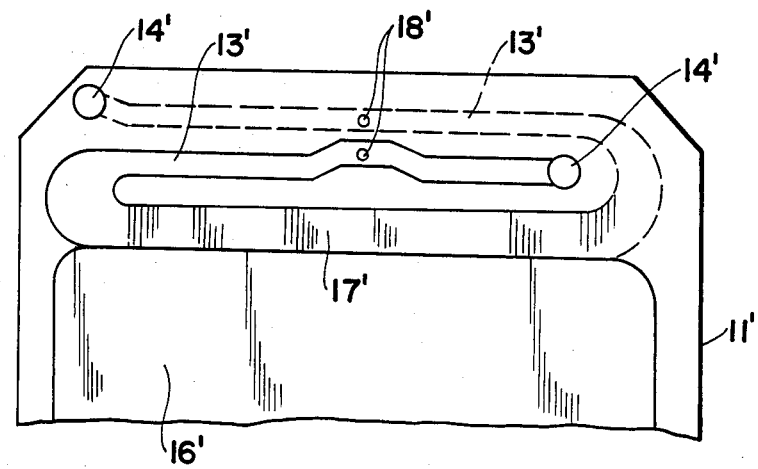
FIGS. 3a, 3b, and 3c are partial exploded plan views of different embodiments of the elements shown in FIG. 2.
Figure 3B:
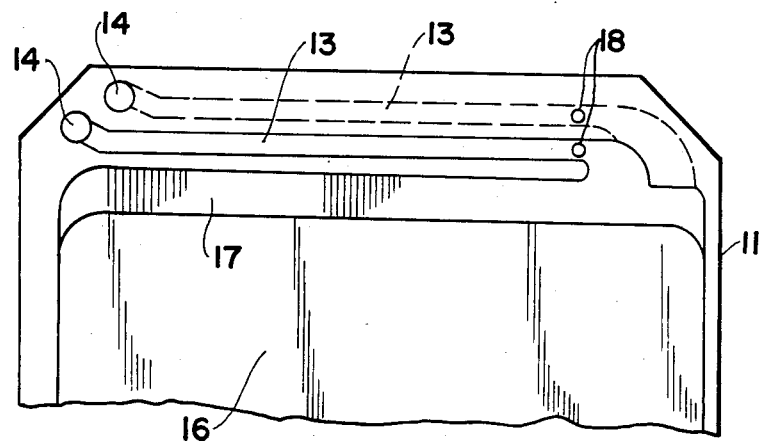

FIG. 3b illustrates in still greater detail the separator 11 of FIGS. 2 and 2a. The channel 13 is shown molded on a top position of both front and rear faces of the separator 11. The bottom portion is not shown for the sake of brevity, and would be similar to the top portion.

The channels 13, are connected to manifold holes 14, as aforementioned. The channels convey electrolyte from the manifold to the center portion 16 of the separator 11 by intermediate conduit undercut 17 which is transversely disposed across the width of the center portion 16.

The protective current is applied via the tunnels, which like the manifolds are formed, molded or machined, etc. holes 18. When the stack 10 is fully assembled, holes 18 become tunnels through the cells as does the manifold holes 14 become a manifold section.

The tunnels and the manifolds are disposed transverse to the channels which fluidically communicate between them and the cells (center portions) of the stack 10.

Figure 3C:
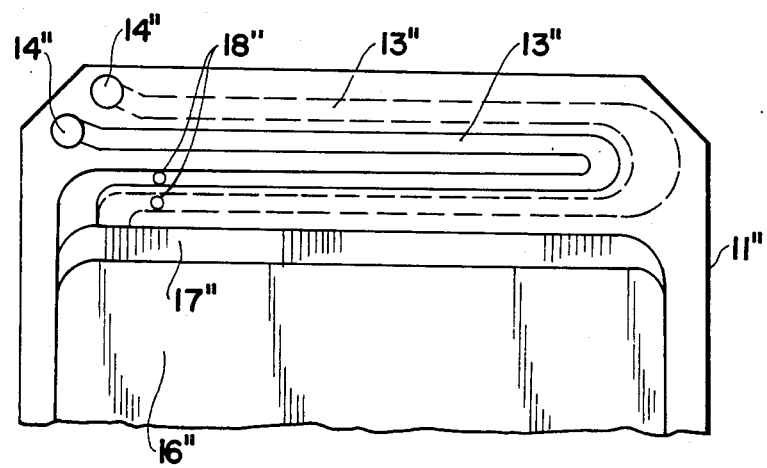

FIGS. 3a and 3c show other embodiments of the separator 11 depicted in FIG. 3b.

For the sake of brevity, like elements have been given the prime designation in FIG. 3a of the elements of FIG. 3b, and the double prime designation in FIG. 3c.

It will be understood that all three embodiments operate and function in an essentially similar manner. The separator 11" has channels 13" which are doubled over and which are therefore greater in length. The separator 11' shows channel holes 18' which are disposed midway between the manifold (holes 14') and the cells (center portions 16').

All of the separators 11, 11' and 11", respectively, teach the fundamental truth of this invention, in that the optimum design requires a long and thin channel, whose hydraulic pressure drop and electrical resistance is greater than the manifold. For this purpose, it will also be noted that manifold holes 14, 14' and 14" are considerably larger than the width of the channels 13, 13' and 13", respectively. Manifolds, tunnels, holes, and channels can be formed, molded or machined into the plastic in a number of ways known in the art.

Having thus described this invention, what is desired to be protected by Letters Patent is presented by the following appended claims.

We claim:

1. An electrochemical device having improved auxiliary power requirements for hydraulic pumping and shunt current protection comprising:
   (a) a plurality of cells, said cells being connected electrically at least in part in series, and connected hydraulically at least in part in parallel;
   (b) at least one common manifold fluidically communicating with said cells;
   (c) respective channels connecting each cell with said manifold, said channels having a hydraulic pressure drop and an electric resistance greater than that of said manifold;
   (d) at least one tunnel interconnecting said channels; and
   (e) means for applying a current through said tunnel to provide current nodes at the intersections of said tunnel and said channels whereby the device has improved auxiliary power requirements for hydraulic and shunt current protection.

2. The electrochemical device of claim 1, wherein said device is a battery.

3. The electrochemical device of claim 2, wherein said battery is a zinc-bromine battery.

4. The electrochemical device of claim 1, wherein said manifolds are disposed transverse to said channels.

5. The electrochemical device of claim 4, wherein said channels are respectively disposed upon a separator of each cell.

6. The electrochemical device of claim 5, wherein said channels are physically designed to be long and narrow, whereby said hydraulic pressure drop and said electrical resistance therein is increased above that of said manifold.

7. The electrochemical device of claim 5, wherein channels are disposed in contiguous fashion upon said separator.

8. The electrochemical device of claim 5, wherein said separator has channels disposed on opposite sides thereof.

9. The electrochemical device of claim 5, wherein said channels are overlapped upon said separator.

10. The electrochemical device of claim 4, wherein said channels are respectively disposed upon an electrode of each cell.

11. The electrochemical device of claim 10, wherein said channels are physically designed to be long and narrow, whereby said hydraulic pressure drop and said electrical resistance therein is increased above that of said manifold.

* * * * *